US011269825B2

(12) United States Patent
Arlt (10) Patent No.: US 11,269,825 B2
(45) Date of Patent: Mar. 8, 2022

(54) PRIVILEGE RETENTION FOR DATABASE MIGRATION

(71) Applicant: SAP SE, Walldorf (DE)

(72) Inventor: Reinhard Arlt, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/713,746

(22) Filed: Dec. 13, 2019

(65) Prior Publication Data

US 2021/0182252 A1 Jun. 17, 2021

(51) Int. Cl.
*G06F 16/21* (2019.01)
*G06F 21/62* (2013.01)

(52) U.S. Cl.
CPC ........ *G06F 16/214* (2019.01); *G06F 21/6227* (2013.01); *G06F 2221/2141* (2013.01); *G06F 2221/2145* (2013.01)

(58) Field of Classification Search
CPC .............................. G06F 16/214; G06F 21/622
See application file for complete search history.

(56) References Cited

U.S. PATENT DOCUMENTS

| 9,111,114 | B1 | 8/2015 | Choi et al. | |
|---|---|---|---|---|
| 9,122,644 | B2 | 9/2015 | Kruglikov et al. | |
| 9,720,923 | B2 | 8/2017 | Gaikwad | |
| 2005/0079565 | A1* | 4/2005 | Chan-Hui | G01N 33/542 |
| | | | | 435/7.92 |
| 2005/0089940 | A1* | 4/2005 | Pidaparthi | G01N 33/542 |
| | | | | 435/7.2 |
| 2005/0240572 | A1* | 10/2005 | Sung | G06F 16/93 |
| 2006/0199231 | A1* | 9/2006 | Moore | G01N 33/5064 |
| | | | | 435/7.23 |
| 2008/0254497 | A1* | 10/2008 | Singh | G01N 33/57492 |
| | | | | 435/29 |
| 2009/0254585 | A1* | 10/2009 | Akers | G06F 16/164 |
| 2010/0100616 | A1* | 4/2010 | Bryson | H04L 63/104 |
| | | | | 709/223 |
| 2013/0085742 | A1* | 4/2013 | Barker | G06F 9/5088 |
| | | | | 703/22 |
| 2014/0101644 | A1 | 4/2014 | Buzaski et al. | |

(Continued)

OTHER PUBLICATIONS

Lefkowitz, R.M., "Can you copy table privileges from one table to another in postgresql?" printed Dec. 5, 2019, from https://stackoverflow.com/questions/27299756/can-you-copy-table-privileges-from-one-table-to-another-in-postgresql, 2 pages, Dec. 4, 2014.

(Continued)

*Primary Examiner* — Eliyah S. Harper
(74) *Attorney, Agent, or Firm* — Sterne, Kessler, Goldstein & Fox P.L.L.C.

(57) ABSTRACT

Disclosed herein are system, method, and computer program product embodiments for performing a database migration with automatic privilege retention and restoration. Embodiments provide for migrating a source database object at a source database to a target database object at a target database. The embodiments provide for binding a retention tag to database objects in order to mark the objects whose privileges are to be retained during a database migration. This approach enables privileges of database objects that are involved in a database migration to be automatically restored at target database objects after the migration.

20 Claims, 4 Drawing Sheets

(56) References Cited

U.S. PATENT DOCUMENTS

| | | | |
|---|---|---|---|
| 2015/0135300 A1* | 5/2015 | Ford | H04L 63/0281 |
| | | | 726/11 |
| 2015/0310188 A1* | 10/2015 | Ford | H04L 63/0428 |
| | | | 726/28 |
| 2017/0039521 A1 | 2/2017 | Henke et al. | |
| 2017/0041296 A1* | 2/2017 | Ford | G06F 16/951 |
| 2018/0107832 A1 | 4/2018 | Ouyang et al. | |
| 2020/0076812 A1* | 3/2020 | Spurlock | H04L 63/102 |
| 2020/0138866 A1* | 5/2020 | Kim | C07K 14/705 |
| 2021/0182252 A1* | 6/2021 | Arlt | G06F 21/6227 |

OTHER PUBLICATIONS

"Setting Privileges Inheritance on Tables anbd Views." printed Dec. 5, 2019 from https:/www.vertica.com/docs/9.2.x/HTML/Content/Authoring/AdministratersGuide/DBUsersAndPrivileges/Privileges/TableViewInheritance.htm, 3 pages.

\* cited by examiner

PRIVILEGE RETENTION FOR DATABASE MIGRATION

BACKGROUND

During a migration or upgrade process of a software system such as a database, database structures such as views or tables of the software system are typically dropped and recreated as part of the migration or update. Once a view or table is dropped, privileges associated with the view or table are automatically revoked and are not available upon recreation of the view or table after the migration. This issue stems from the migration procedure not being aware of the privileges that need to be granted when the view or table are recreated.

As a result, privileges of tables or views are not carried over during the migration which results in software that is lacking the necessary privileges and functionality in its recreated tables or views. The software, such as the interfaces to access the database become unstable if not completely unusable. Attempts to restore the privileges in the recreated tables or views have to be done manually which can be unreliable and may result in missing privileges. Accordingly, it is desirable to include a mechanism for retaining the privileges before and after a migration such that the privileges of a view or table that exist before the migration may be implemented on the updated view or tables after the migration.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, maintaining continuity of access to migrated database objects in a database system through the use of privilege retention.

Databases can be migrated from one database system to another. During migration, various database objects such as views or tables are necessarily migrated as part of the migration process. This migration includes dropping the database structure prior to migration and recreating anew the structure after the migration. Privileges to objects are generally associated with users or roles of the users in each database structure so when the structure is dropped prior to migration, those privileges are automatically revoked. In an embodiment, privileges are granted to roles and users are assigned to roles. When assigned, the user automatically is granted the privileges of the assigned role. Accordingly, the migration process results in revoked privileges for the associated user or role and the process for re-establishing those privileges for the recreated structure are tedious. Moreover, since privileges are revoked and not stored prior to migration, it may not be possible to re-establish every privilege that was granted to the prior database structure.

Figure 1:
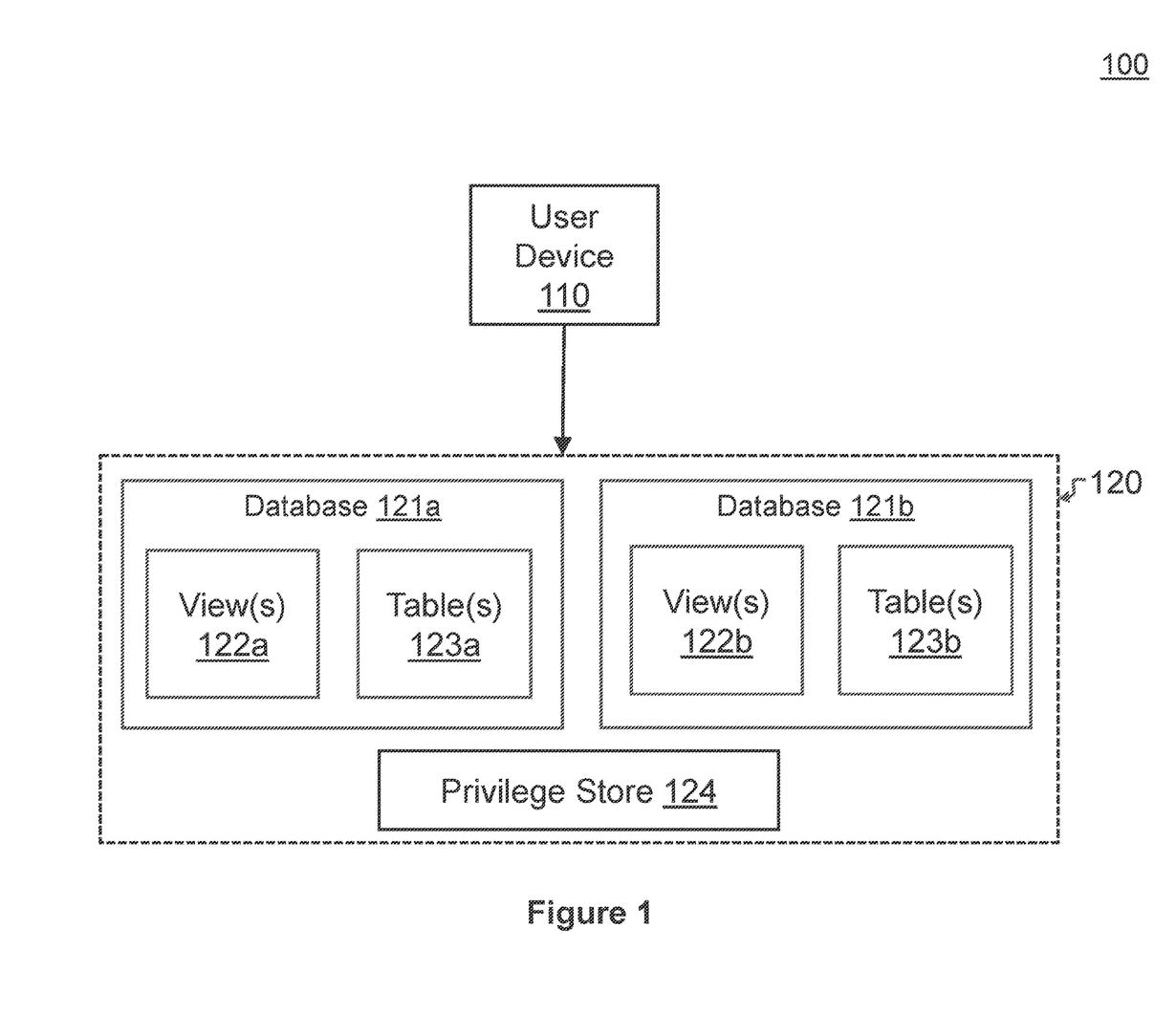
FIG. 1 is a system diagram, in accordance with an embodiment.

In an embodiment, a database system may migrate various database objects between databases such as from a source database to a target database. FIG. 1 is a system diagram of a database environment 100, in accordance with an embodiment. Database environment 100 can include user device 110 associated with a user that has been granted privileges to various database objects within database system 120. Although only one user device is shown, database environment 100 may include multiple user devices each associated with a user that has been granted privileges to database objects within database environment 100. Database environment can further include database system 120 which may contain database 121*a* and database 121*b*. Database 121*a* may include any number of view(s) 122*a* and table(s) 123*a* and database 121*b* may include any number of view(s) 122*b* and table(s) 123*b*. Database system 120 can also include privilege store 124 which collects all granted privileges of database objects (e.g., view(s) 122*a* or 122*b*, table(s) 123*a* or 123*b*) that are part of a migration process (e.g., between databases 121*a* and 122*b*).

During a migration in database system 120, database objects, such as a source database object and a target database object, may be migrated between database 121*a* and database 121*b* with one of the databases acting as a source database system and another acting as a target database system. In the examples discussed herein, database objects of database 121*a* are being migrated to database 121*b*. Database objects include views and tables. A source database object may represent the original database object that is part of a source database that is to be migrated; a target database object may represent the migrated or new database object that is part of the target database to which the source database is being migrated.

In an embodiment, database 121*a* includes view(s) 122*a* and table(s) 123*a* and database 121*b* includes view(s) 122*b* and table(s) 123*b*. View(s) 122*a* and view(s) 122*b* may be any object that is a result set of a query on data stored in database 121*a* and database 121*b*, respectively. For example, view(s) 122*a* may include a result set combining data from table(s) 123*a*. Table(s) 123*a* and table(s) 123*b* may be any standard table storing data and that is accessible to applications such as applications in user device 110, applications that are part of database 121*a*, or applications that are part of database 121*b*.

Privilege store 124 is an object that stores and restores privileges associated with database 121*a* and 121*b*. In an embodiment, privilege store 124 may utilize a retention tag that binds to database objects to mark the database objects whose privileges are to be retained as part of migrating the database object. Retention tags can be implemented as an optional property. A benefit of implementing the retention tag as an optional property allows for the retention of privileges to be optional for each migration procedure.

In this embodiment, when the retention tag is bound to the database objects, privilege store 124 may automatically trigger privilege retention based on certain such events such as certain actions associated with the database object. Triggers may be configured prior to migration and may be utilized as means for automatically initiating the privilege retention process by a database. For example, triggers may be configured based on specific actions during performed on the database object such as database object creation or deletion.

In an embodiment, if a database object is removed and a privilege property is bound to it, privilege store 124 may automatically retain any privileges associated with the database object and restore those privileges upon creation of an associated source database object. Privilege store 124 may then work in conjunction with the retention tag to implement automatic triggers for retaining and restoring privileges without the need for programmer intervention. Removing or unbinding a retention tag from a database object when privileges associated with that database object are stored in privilege store 124 can result in removal of those privileges from privilege store 124. Accordingly, retention tags enable privilege store 124 to efficiently manage retained privileges as well as handle situations when privileges need to be added or removed from the store.

In an embodiment, the retention tag is part of the migration process. If a source database object is bound to a retention tag, then the associated target database object may also be bound to that same retention tag. Accordingly, removing the retention tag from the associated target database object can result in removal of the associated privileges from privilege store 124. Retention tags may be bound to a database object upon creation, in accordance with a non-limiting exemplary embodiment, using the following code:

---

CREATE OBJECT <object name> WITH TAG (SAVE_PRIVILEGES_FOR_RECREATION)
    /* Removing the tag from the object would disable the feature. Object may be implemented as view or a table */

---

In other embodiments, retention tags may be bound to the object after creation. After binding, retention tags can be enabled or disabled where an enabled retention tag indicates that privileges for the associated data object are to be retained for subsequent restoration during a migration. In other embodiments, retention tags may be employed outside of a migration process such as when an application maintains and changes, at runtime, its own interface consisting of tables and/or views. The application may use retention tags to drop and recreate tables and/or views as part of this process to save and restore privileges associated with the modified interface.

In an embodiment, during a migration, objects from database 121*a* are migrated to database 121*b*. Examples of migrating objects include migrating one or more tables (e.g., table(s) 123*a*) to another one or more tables (e.g., table(s) 123*b*), one or more tables (e.g., table(s) 123*a*) to one or more views (e.g., view(s) 122*b*), one or more views (e.g., view(s) 122*a*) to one or more tables (e.g., table 123*b*), and/or one or more views (e.g., view(s) 122*a*) to another one or more views (e.g., view(s) 123*a*). Privilege store 124 may be utilized for any of these migration procedures. When implemented as an optional property, the privilege property may be bound to the database object to be migrated such that any privileges associated with that database object are retained even after the database object is deleted during the migration.

Database objects do not necessarily share the same privileges. A database object of one type, such as a table, may have different privileges than a database object of another type, such as a view. So when migrating between different types of database objects (e.g., from a table to a view), privilege store 124 determines whether privileges associated with source database object should be restored when migrating to a target database object. As one non-limiting example, a "insert" privilege from a source table would not be granted to a target view because granting "insert" privileges to a view may lead to a runtime error. In an embodiment, privilege store 124 may control which privileges from a source database object are restored using a parameter modified during the migration process and based on the specific properties of the target and source database objects. In other words, privilege store 124 may store all privileges associated with target database objects during a migration and restore a subset of these privileges based on the source database object.

In an embodiment, privilege store 124 may delete privileges associated with the user or role whenever the user or role is removed from the corresponding database. For example, if User A is removed from database system 120 (e.g., left the company), all privileges associated with User A may be automatically removed from privilege store 124.

During migration, a target database object (e.g., view(s) 122*b* or table(s) 123*b*) is created in the target database (e.g., database 121*b*). This target database object corresponds to the source database object from the database that is being migrated (e.g., database 121*a*) and therefore is to be granted the privileges associated with the source database object. Target database object may be created, in accordance with a non-limiting exemplary embodiment, using the following code:

---

CREATE target_object LIKE source_object [WITH DATA][WITH PRIVILEGES]
    /* Create a new database object based a source database object*/

---

In some embodiments, the database objects include tables and views. Migration may include migrating a database object of one type (e.g., a table) to one of a second type (e.g., a view). In accordance with a non-limiting embodiment, the following code provides an example for migrating a source table to a target view:

---

ANNOTATE <table_name> SET 'RETAIN_PRIVILEGES_FOR_TYPE'= 'table, view'
    /* In case a table is to be migrated to a view the table gets an annotation which is checked upon deletion of the table. Since the annotations are also deleted upon the deletion of the refered object, the name/value pair also has to be stored with the retained privileges. Upon anew creation of a view or table with the name <table_name> the system looks up the RETAINED_PRIVILEGES for entries valid for type, table, or view. Also the annotation has to be created anew. */

One skilled in the relevant arts will appreciate that using this exact code is not required, and other approaches that accomplish the same storing of privileges associated with database objects. More generically, the logic may include:

```
STORE PRIVILEGES ...
    /* Saving privileges for the database object */
RESTORE PRIVILEGES ...
    /* Restoring privileges for the database object */;
```

In an embodiment, the database itself (i.e., not an external device) may initiate the necessary code for storing and restoring privileges thereby offloading the process from an external device such as a server. In embodiments where privilege retention is bound to the database object such as through a retention tag, the database in which the database object is stored may initiate privilege retention based on a trigger associated with the database object. Examples of these triggers include but are not limited to dropping a database object, creating a database object, or detecting a migration associated with the database object.

When stored, such as in a privilege object, privileges associated with the database object may be retained beyond the lifetime of the database object. In conventional systems, when a database object may be destroyed as part of a migration process, its associated privileges are revoked and potentially lost since the migration procedure is unaware of the privileges that need to be granted to the target database object. By utilizing a privilege retention procedure in accordance with the embodiments described herein, privileges can outlive their respective associated database object even after the associated database object is destroyed. Once retained, such as in an associated privilege object within a privilege store, privileges may be subsequently granted to corresponding target database objects as part of the migration.

Figure 2:
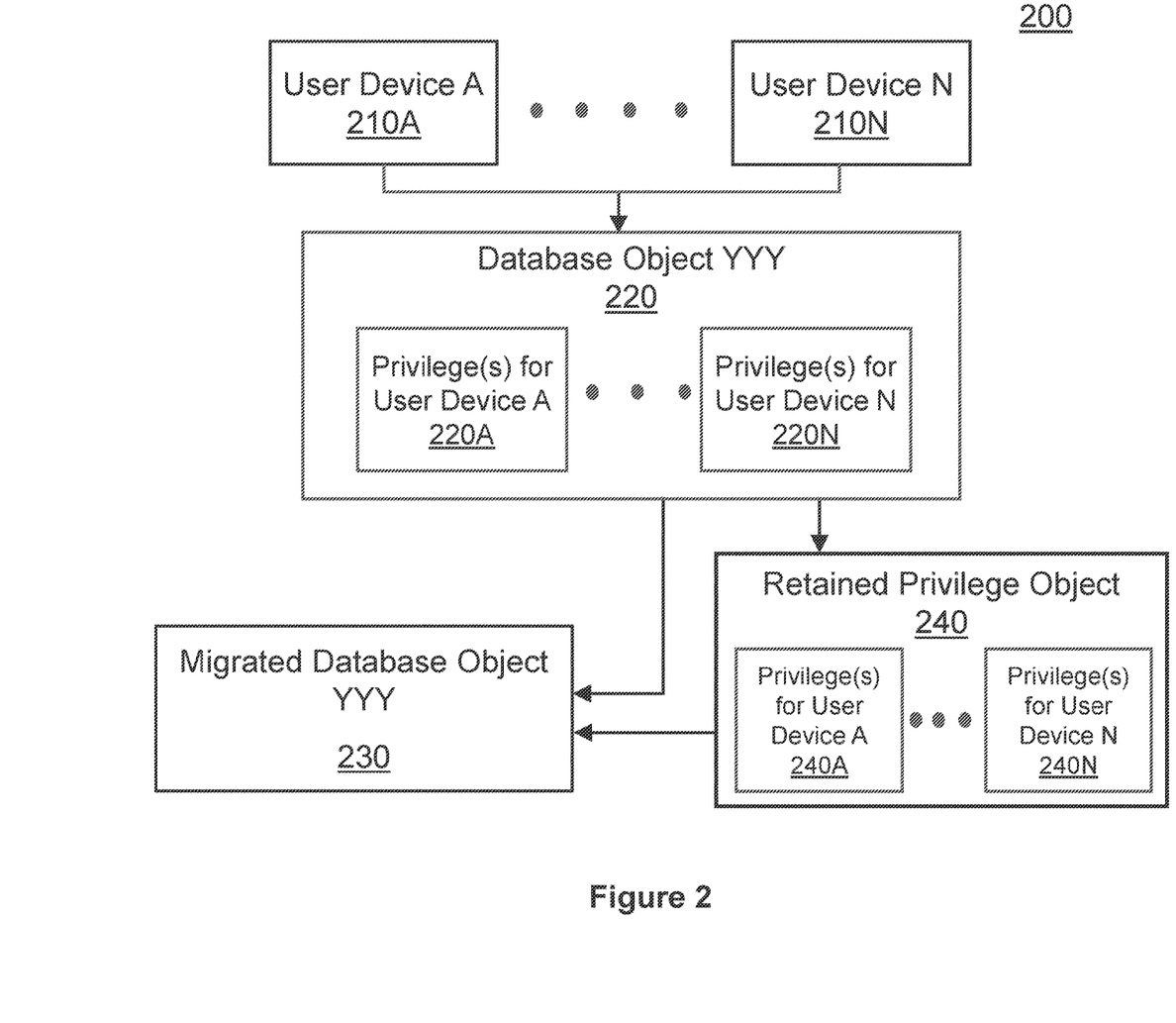
FIG. 2 is a diagram illustrating an exemplary migration with privilege retention, in accordance with an embodiment.

FIG. 2 is a diagram illustrating an exemplary migration with privilege retention, in accordance with an embodiment. As shown in migration diagram 200, database object 220, which may be located at a source database, is being migrated to a migrated database object 230, which may be located at a target database.

Database object 220 may include privileges 220A associated with user device A 210A and privileges 220N with user device N 210N. At the start of a migration, the database can determine whether database object 220 is to be destroyed as part of the migration and then subsequently recreated after the migration is completed. If so, the database may initiate a privilege retention process whereby privileges 220A and 220N may be stored within retained privilege object 240. In an embodiment, the privileges are stored upon deletion of database object 220. As part of the migration, the database may create new database objects such as migrated database object 230. Upon or after creation of migrated database object 230, the database may restore privileges 220A and 220N and stored them in migrated database object 230. As a result of this privilege retention process, user device A 210A and user device 210N may have the same privileges, such as privileges 220A and privileges 220N, loaded into migrated database object 230.

In some embodiments, the described privilege retention process may occur as a separate process from the process that migrates data from database object 220 to migrated database object 230. Accordingly, saving and subsequently copying the data (not privileges) during the migration may be optional such that while privileges of a database object may be retained and restored, the data in the database object may not necessarily need to be retained and restored. But if data is to be included as part of the migration, the process for doing involves storing the data in a separate database element than retained privilege object 240. In an embodiment, retained privilege object 240 is limited to storing privileges associated with user devices 210A and 210N.

It is important to note that the discussed sequence of steps is merely exemplary. One skilled in the relevant arts would understand that the steps may be implemented or occur in a different sequence than described. For example, migrated database object 230 may be created prior to deletion of database object 220. If a trigger is configured when a database object is created, in this example, the creation of migrated database object 230 can result in initiating the privilege retention process.

When creating migrated database object 230, the database may utilize a definition associated with database object 220. In other words, migrated database object 230 is created based on the definition of database object 220.

Figure 3:
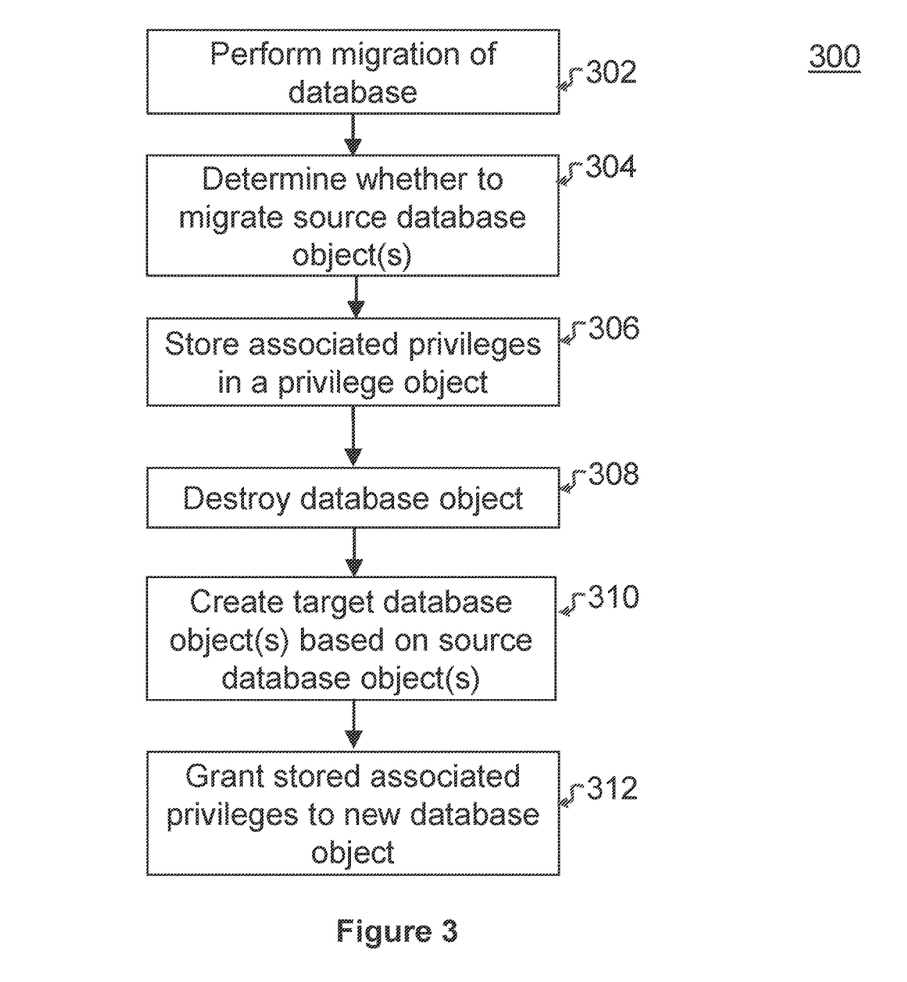
FIG. 3 is a flow chart illustrating an exemplary migration method using privilege retention, in accordance with an embodiment.

FIG. 3 is a flow chart illustrating an exemplary migration method using privilege retention, in accordance with an embodiment. As a non-limiting example with regards to FIGS. 1 and 2, one or more processes described with respect to FIG. 3 may be performed by a database system (e.g., database system 120 of FIG. 1) or a database for retaining privileges during a migration procedure. In such an embodiment, database system 120 may execute code in memory to perform certain steps of method 300 of FIG. 3. While method 300 of FIG. 3 will be discussed below as being performed by database system 120, other devices including may store the code and therefore may execute method 300 by directly executing the code. Accordingly, the following discussion of method 300 will refer to devices of FIGS. 1-2 as an exemplary non-limiting embodiment of method 300. Moreover, it is to be appreciated that not all steps may be needed to perform the disclosure provided herein. Further, some of the steps may be performed simultaneously or in a different order than shown in FIG. 3, as will be understood by a person of ordinary skill in the art.

In 302, a migration is performed of a database, such as from a source database to a target database. The migration may be initiated by the source or target databases or by a device external to the database such as a server or a database system.

In 304, a determination is made as to whether database objects are to be migrated as part of the migration of the database, such as a source database object and a target database object. Any number of source database objects may be determined to be part of the migration. In some embodiments, the determination is made based on detecting a retention tag bound to a database object. The retention tag may be bound to a database object through an enablement or disablement function where a tag is enabled or disabled for each database object. An enabled retention tag can indicate that the privileges of the database object are to be part of a migration; conversely, a disabled retention tag can indicate that the privileges do not need to be retained. In some embodiments, the migration process requires destroying the database object at the source database and recreated anew at the target database.

In 306, privileges associated with the database object(s) that are to be migrated as part of the migration can then be stored in a storage location such as a privilege object. In some embodiments, the privilege object may be located in a privilege store that is implemented external to the source and target databases but within the database system.

In 308, source database object(s) that are determined to be destroyed as part of the migration are destroyed in this step. In some embodiments, destroying the object(s) may act as a trigger for initiating the privilege retention process for privileges associated with the object. As discussed above, other triggers may be implemented in addition to or instead of destroying of the source database object, such as creation of the target database object or initiating of the migration process.

In 310, a new database object (or objects), such as the target database object, is created at the target database. Each created target database object is based on a corresponding source database object. As previously noted, the creation of the target database object can be a trigger for initiating the privilege retention process.

In 312, after creation of the target database, privileges associated with the source database object are granted to the corresponding target database object.

Figure 4:
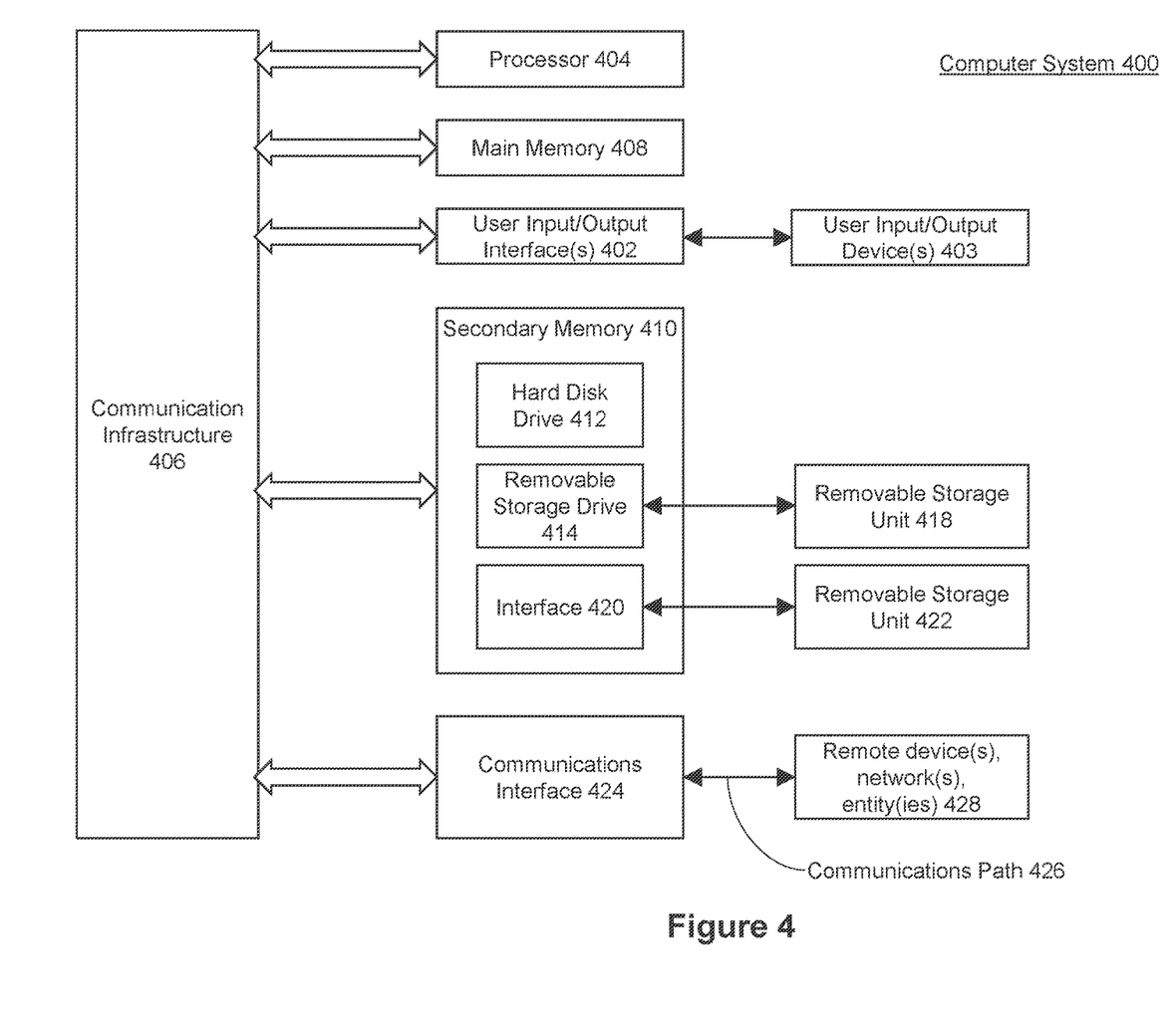
FIG. 4 is an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424.

Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   binding, by one or more computing devices, an enabled retention tag to a database object and a disabled retention tag to another database object, wherein the database object and the another database object are located in a source database;
   initiating a migration, by the one or more computing devices, from the source database to a target database, wherein the migration involves destroying the database object and the another database object in the source database;
   determining, based on the enabled retention tag by the one or more computing devices, to retain a privilege associated with the database object and, based on the disabled retention tag by the one or more computing devices, to not retain another privilege associated with the another database object;
   retaining, by the one or more computing devices, the privilege in a privilege store based on the determining;
   revoking, by the one or more computing devices, the another privilege in the privilege store based on the determining;
   granting, by the one or more computing devices from the privilege store, the privilege to a migrated database object at the target database.

2. The method of claim 1, further comprising:
   detecting, by the one or more computing devices, that the enabled retention tag has been removed from the migrated database object; and
   removing, based on the detecting, the privilege from the privilege store.

3. The method of claim 1, wherein the privilege is associated with a user and the method further comprising:
   detecting that the user is removed from the source database or the target database; and
   removing, based on the detecting, the privilege from the privilege store.

4. The method of claim 1, wherein the privilege comprises a plurality of privileges and wherein granting the privilege comprises:
   determining, based on the database object and the migrated database object, a subset of the plurality of privileges to be granted to the migrated database object; and
   granting the subset of plurality of privileges to the migrated database object.

5. The method of claim 1, further comprising:
   creating the migrated database object based on a definition associated with the database object.

6. The method of claim 1, further comprising:
   configuring, by the one or more computing devices, a trigger to initiate the retaining of the privilege during the migration.

7. The method of claim 6, wherein the trigger includes at least one of a deletion of the database object or a creation of the migrated database object.

8. A system, comprising:
   a memory configured to store operations; and
   one or more processors configured to perform the operations, the operations comprising:

binding an enabled retention tag to a database object and a disabled retention tag to another database object, wherein the database object and the another database object are located in a source database;

initiating a migration from the source database to a target database, wherein the migration involves destroying the database object and the another database object in the source database;

determining, based on the enabled retention tag, to retain a privilege associated with the database object and, based on the disabled retention tag by the one or more computing devices, to not retain another privilege associated with the another database object;

retaining the privilege in a privilege store based on the determining; and granting, from the privilege store, the privilege to a migrated database object at the target database.

9. The system of claim 8, the operations further comprising:

detecting that the enabled retention tag has been removed from the migrated database object; and removing, based on the detecting, the privilege from the privilege store.

10. The system of claim 8, wherein the privilege is associated with a user and the operations further comprising:

detecting that the user is removed from the source database or the target database; and removing, based on the detecting, the privilege from the privilege store.

11. The system of claim 8, wherein the privilege comprises a plurality of privileges and wherein granting the privilege comprises:

determining, based on the database object and the migrated database object, a subset of the plurality of privileges to be granted to the migrated database object; and granting the subset of plurality of privileges to the migrated database object.

12. The system of claim 8, the operations further comprising:

creating the migrated database object based on a definition associated with the database object.

13. The system of claim 8, the operations further comprising:

configuring, by the one or more computing devices, a trigger to initiate the retaining of the privilege during the migration.

14. The system of claim 13, wherein the trigger includes at least one of a deletion of the database object or a creation of the migrated database object.

15. A computer readable storage device having instructions stored thereon execution of which, by one or more processing devices, causes the one or more processing devices to perform operations comprising:

binding an enabled retention tag to a database object and a disabled retention tag to another database object, wherein the database object and the another database object are located in a source database;

initiating a migration from the source database to a target database, wherein the migration involves destroying the database object and the another database object in the source database;

determining, based on the enabled retention tag, to retain a privilege associated with the database object and, based on the disabled retention tag by the one or more computing devices, to not retain another privilege associated with the another database object;

retaining the privilege in a privilege store based on the determining; and granting, from the privilege store, the privilege to a migrated database object at the target database.

16. The computer readable storage device of claim 15, the operations further comprising:

detecting that the enabled retention tag has been removed from the migrated database object; and removing, based on the detecting, the privilege from the privilege store.

17. The computer readable storage device of claim 15, wherein the privilege is associated with a user and the operations further comprising:

detecting that the user is removed from the source database or the target database; and removing, based on the detecting, the privilege from the privilege store.

18. The computer readable storage device of claim 15, wherein the privilege comprises a plurality of privileges and wherein granting the privilege comprises:

determining, based on the database object and the migrated database object, a subset of the plurality of privileges to be granted to the migrated database object; and granting the subset of plurality of privileges to the migrated database object.

19. The computer readable storage device of claim 15, the operations further comprising:

creating the migrated database object based on a definition associated with the database object.

20. The computer readable storage device of claim 15, the operations further comprising:

configuring, by the one or more computing devices, a trigger to initiate the retaining of the privilege during the migration.

* * * * *